(12) United States Patent
Blaise et al.

(10) Patent No.: US 12,544,992 B2
(45) Date of Patent: *Feb. 10, 2026

(54) DEVICE FOR MOULDING A BLADED PART OF A TURBOMACHINE

(71) Applicant: SAFRAN AIRCRAFT ENGINES, Paris (FR)

(72) Inventors: Maxime Marie Desire Blaise, Moissy-Cramayel (FR); Hubert Jean Marie Fabre, Moissy-Cramayel (FR); Jeff Pote, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/557,002

(22) PCT Filed: Apr. 22, 2022

(86) PCT No.: PCT/FR2022/050765
§ 371 (c)(1),
(2) Date: Oct. 24, 2023

(87) PCT Pub. No.: WO2022/229547
PCT Pub. Date: Nov. 3, 2022

(65) Prior Publication Data
US 2024/0059032 A1    Feb. 22, 2024

Related U.S. Application Data

(63) Continuation of application No. 17/242,942, filed on Apr. 28, 2021.

(30) Foreign Application Priority Data

Dec. 16, 2021  (FR) ........................... 2113614

(51) Int. Cl.
B29C 70/48    (2006.01)
B29C 33/00    (2006.01)
(Continued)

(52) U.S. Cl.
CPC .......... *B29C 70/48* (2013.01); *B29C 33/0038* (2013.01); *B29C 61/0658* (2013.01);
(Continued)

(58) Field of Classification Search
CPC ... B29C 70/48; B29C 33/0038; B29C 70/541; B29C 33/00; B29C 70/00; B29C 45/00; B29C 70/54; B29L 2031/08
See application file for complete search history.

(56) References Cited

U.S. PATENT DOCUMENTS 5,190,773 A * 3/1993 Damon ................... B29C 43/32
425/417
5,686,038 A * 11/1997 Christensen ............ B29C 70/48
264/40.5
(Continued)

FOREIGN PATENT DOCUMENTS

CN    108995250 A  * 12/2018  ......... B29C 33/3842
FR    2956057 A1     8/2011
(Continued)

OTHER PUBLICATIONS

Bao J., et al. "English Machine Translation of CN-108995250-A". 2024. EPO. Espacenet. (Year: 2024).*
(Continued)

Primary Examiner — Susan D Leong
Assistant Examiner — Jonathan B Woo
(74) Attorney, Agent, or Firm — WOMBLE BOND DICKINSON (US) LLP

(57) ABSTRACT

A device for moulding at least one bladed part of a turbine engine, including a base; a mould formed from a plurality of
(Continued)

parts nested inside one another, this mould being applied to the base. A first seal is mounted between the mould and the base; and a bell is mounted on the mould and around the mould, this bell being applied to the base. A second seal is mounted between the bell and the base, this bell being configured to be held tight against the base and having interior surfaces engaging by wedge effect with complementary exterior surfaces of the mould in order to apply a clamping force on the parts of this mould.

17 Claims, 17 Drawing Sheets

(51) Int. Cl.
*B29C 61/06* (2006.01)
*B29C 70/54* (2006.01)
*B29L 31/08* (2006.01)
*F01D 5/28* (2006.01)

(52) U.S. Cl.
CPC ............ *B29C 70/541* (2013.01); *F01D 5/282* (2013.01); *B29L 2031/08* (2013.01)

(56) References Cited

U.S. PATENT DOCUMENTS

| | | | |
|---|---|---|---|
| 6,413,074 B1* | 7/2002 | Hays | B29C 33/30 |
| | | | 425/398 |
| 2014/0197567 A1* | 7/2014 | Plante | B29C 70/461 |
| | | | 264/219 |
| 2016/0009003 A1* | 1/2016 | Chauvin | B29C 70/462 |
| | | | 425/542 |
| 2016/0121562 A1 | 5/2016 | Werner et al. | |
| 2016/0297153 A1 | 10/2016 | Henrio et al. | |
| 2018/0029315 A1* | 2/2018 | Howland | B29C 70/467 |
| 2020/0094496 A1* | 3/2020 | Santoni | B29C 70/46 |
| 2021/0010377 A1* | 1/2021 | Blanquart | B29C 65/5057 |
| 2021/0162683 A1 | 6/2021 | Backhouse et al. | |

FOREIGN PATENT DOCUMENTS

| | | |
|---|---|---|
| FR | 3014008 A1 | 6/2015 |
| FR | 3029134 A1 | 6/2016 |
| FR | 3032147 A1 | 8/2016 |
| FR | 3046564 A1 | 7/2017 |
| FR | 3051386 A1 | 11/2017 |
| WO | 2014/076408 A1 | 5/2014 |

OTHER PUBLICATIONS

Bao et al., "Machine Translation: RTM (resin transfer molding) mold for partition type rotating structure composite parts", EPO, Espacenet, 2023, 10 pages.

International Search Report received for PCT Patent Application No. PCT/FR2022/050765, mailed on Sep. 16, 2022, 6 pages (2 pages of English Translation and 4 pages of Original Document).

Written Opinion received for PCT Patent Application No. PCT/FR2022/050765, mailed on Sep. 16, 2022, 12 pages (4 pages of English Translation and 8 pages of Original Document).

* cited by examiner

[Fig.1]
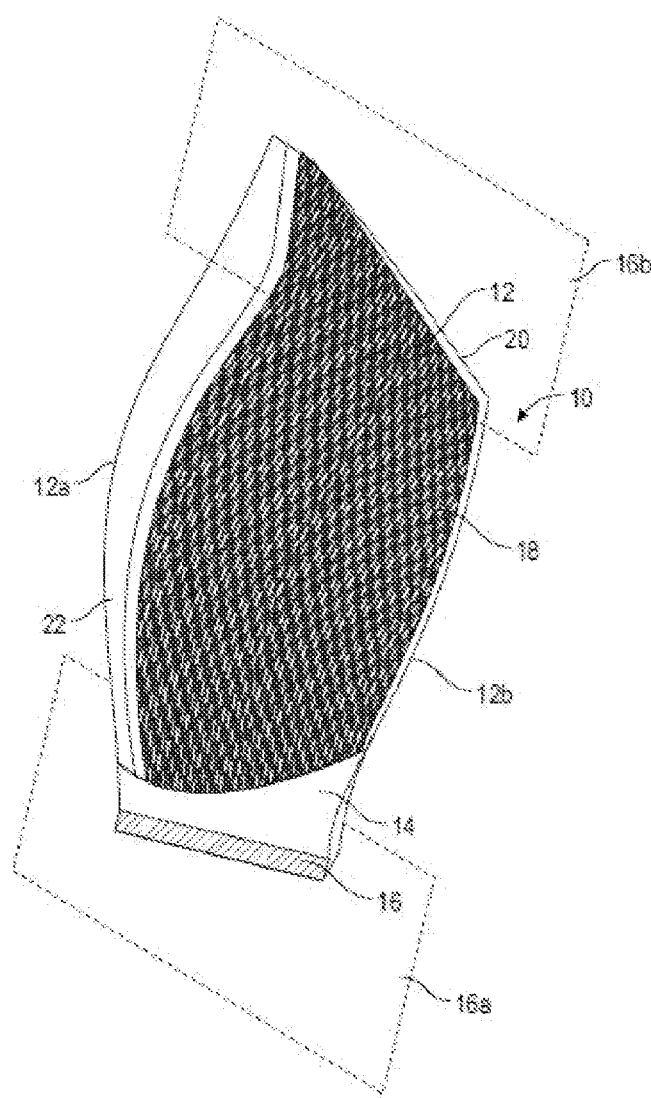

[Fig.2]
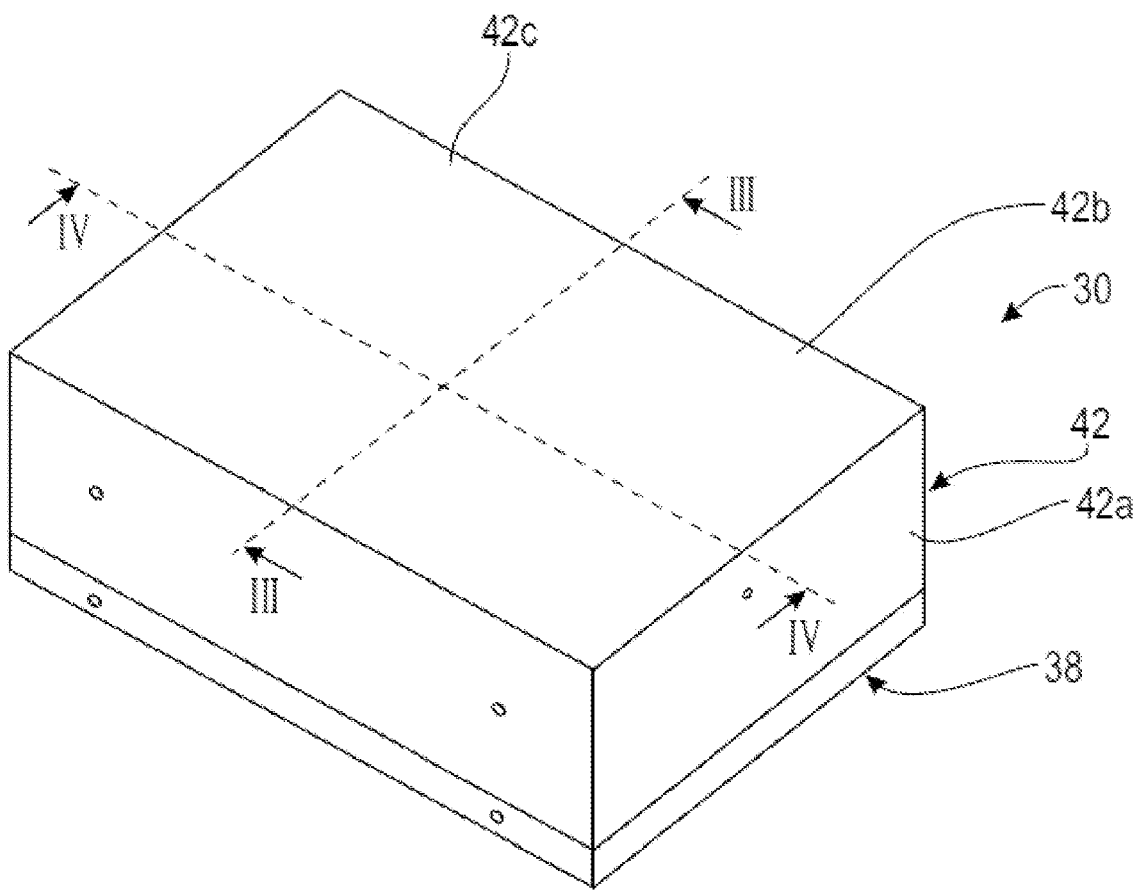

[Fig.3]
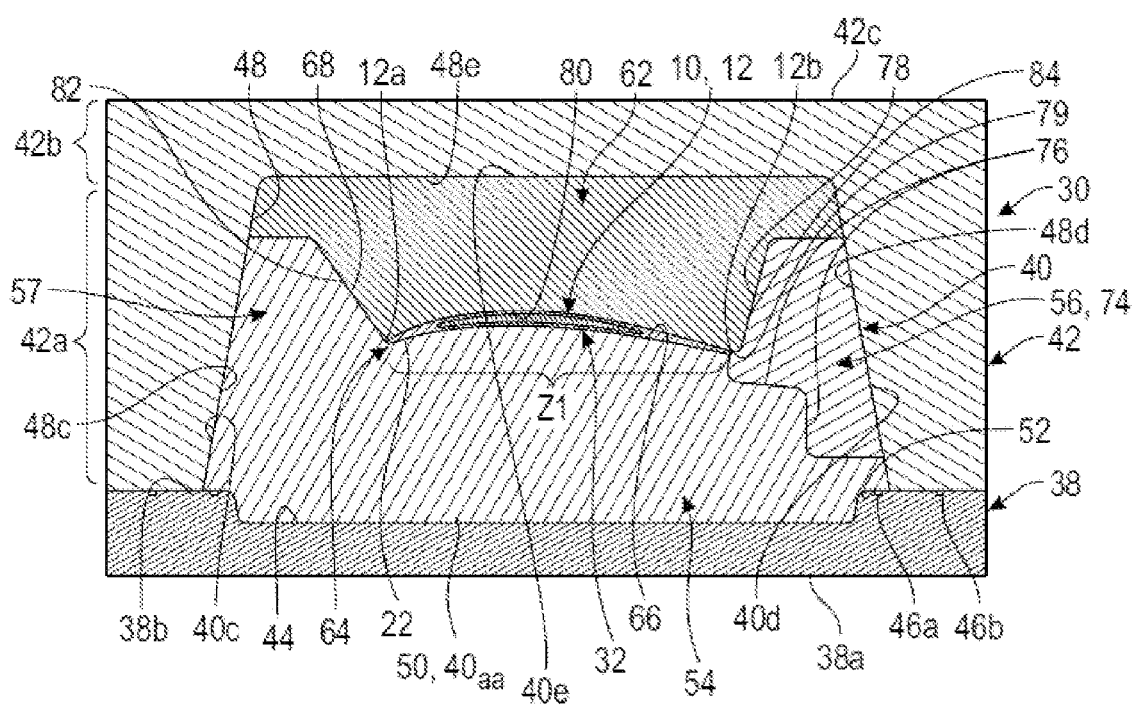

[Fig.4]
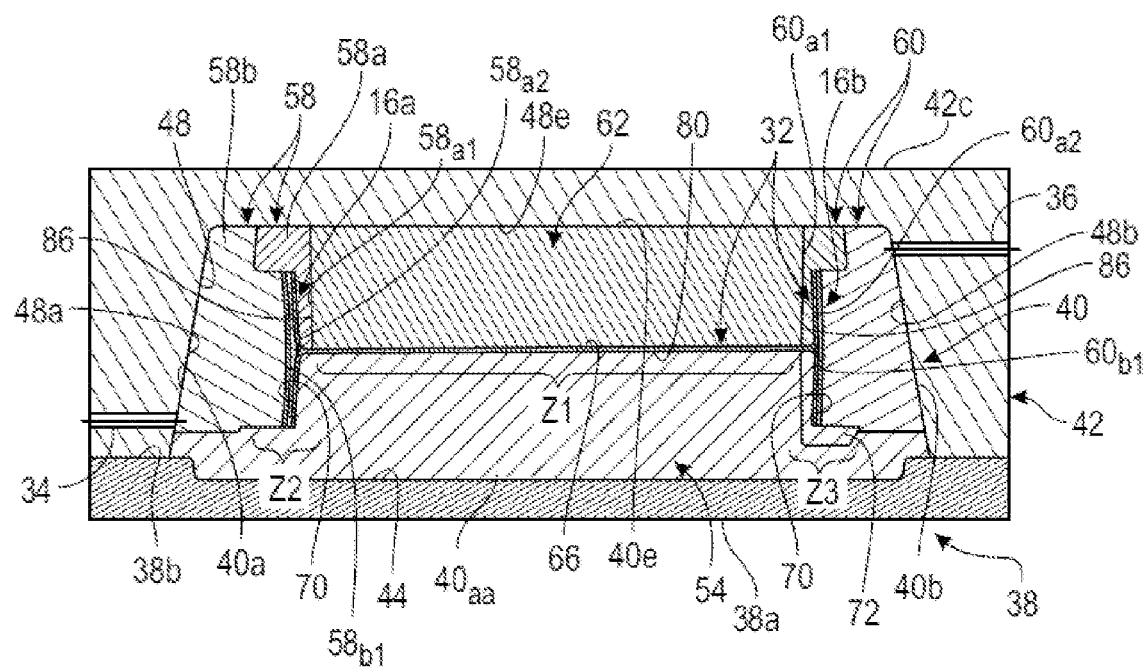

[Fig.5]
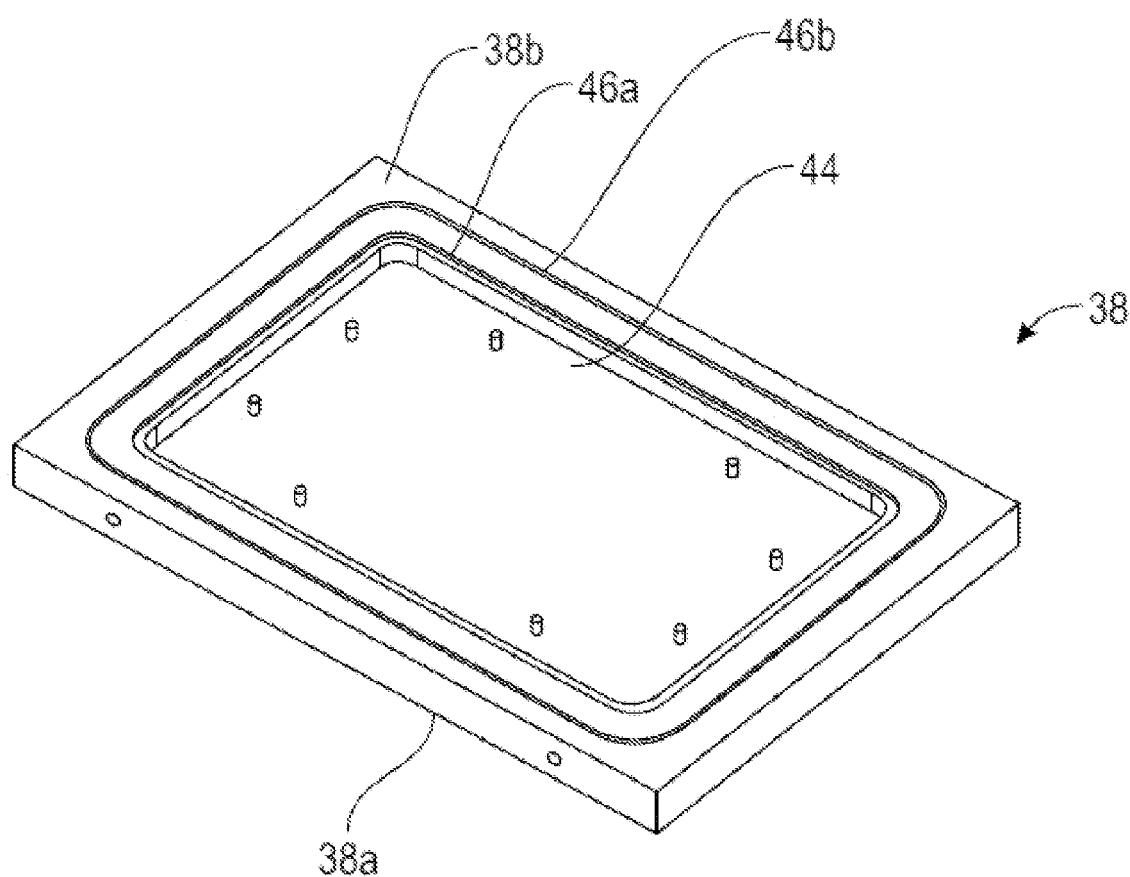

[Fig.6]
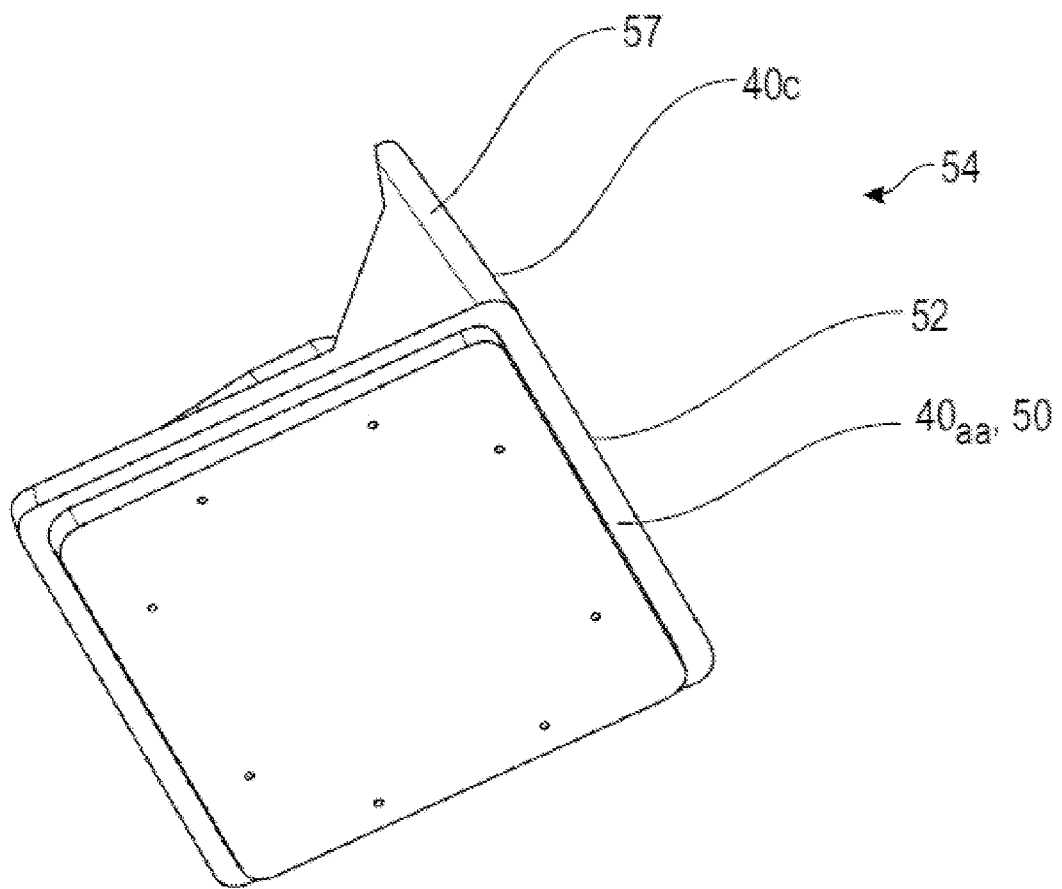

[Fig.7]
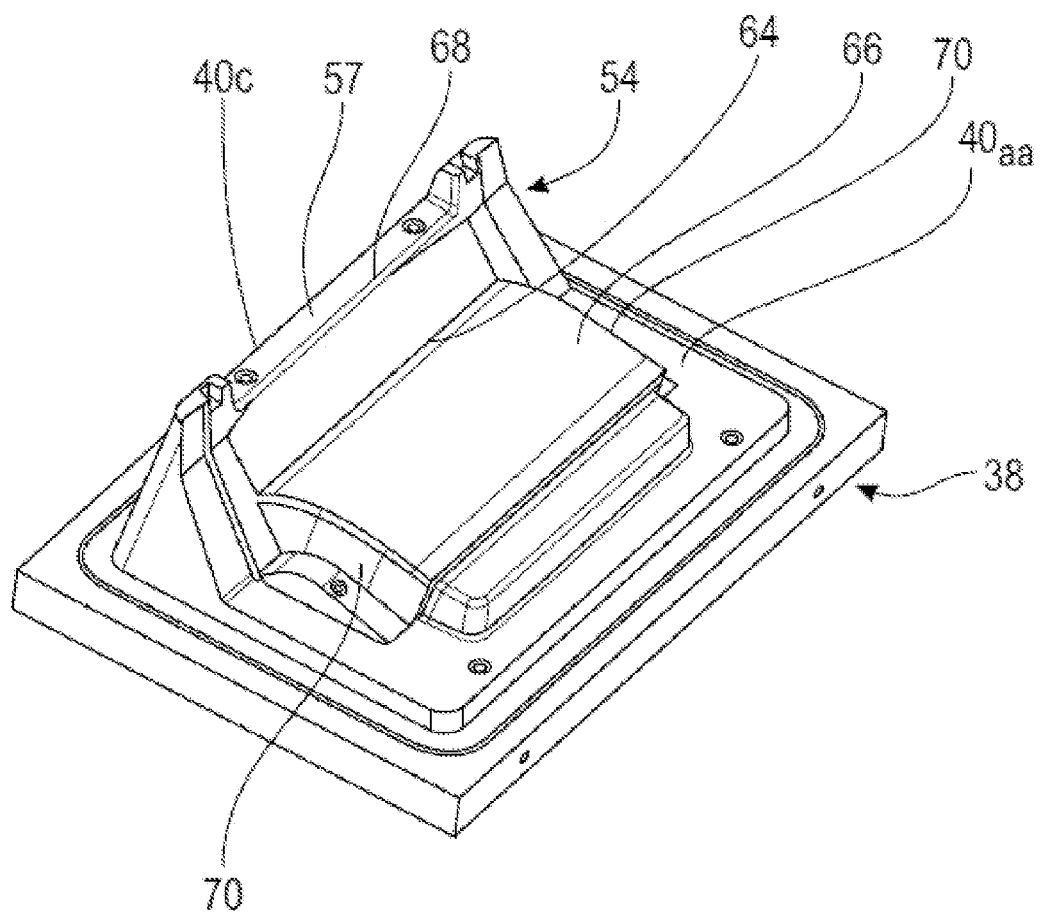

[Fig.8]
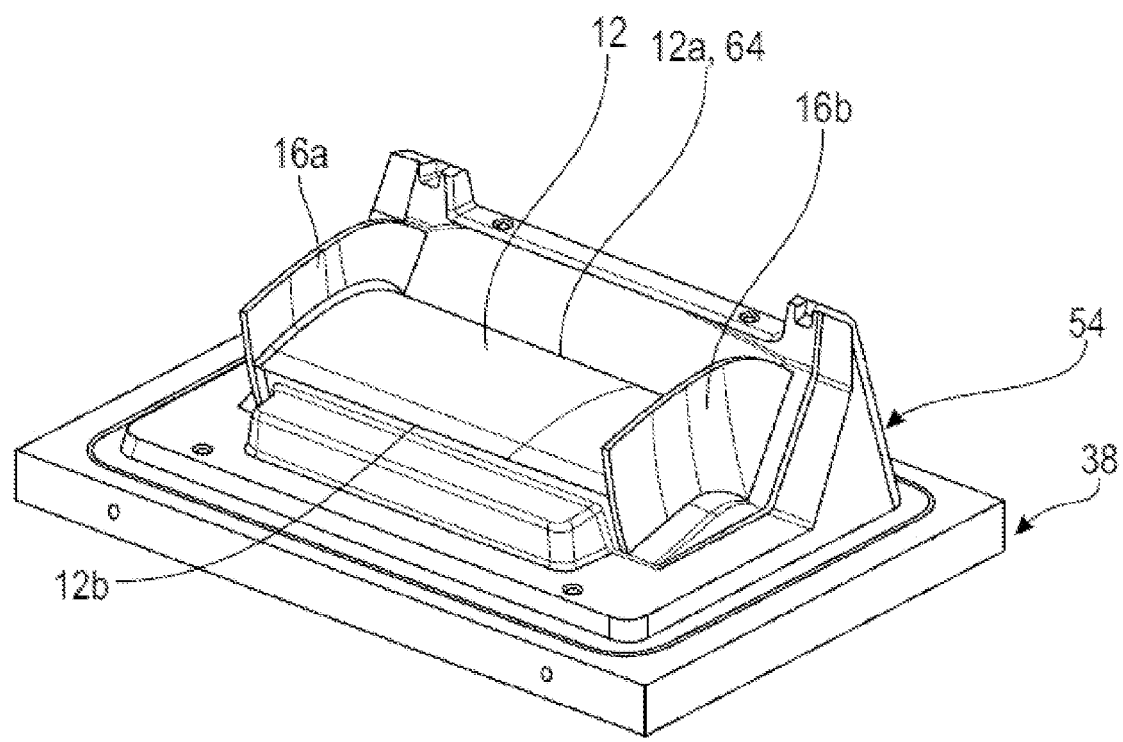

[Fig.9]
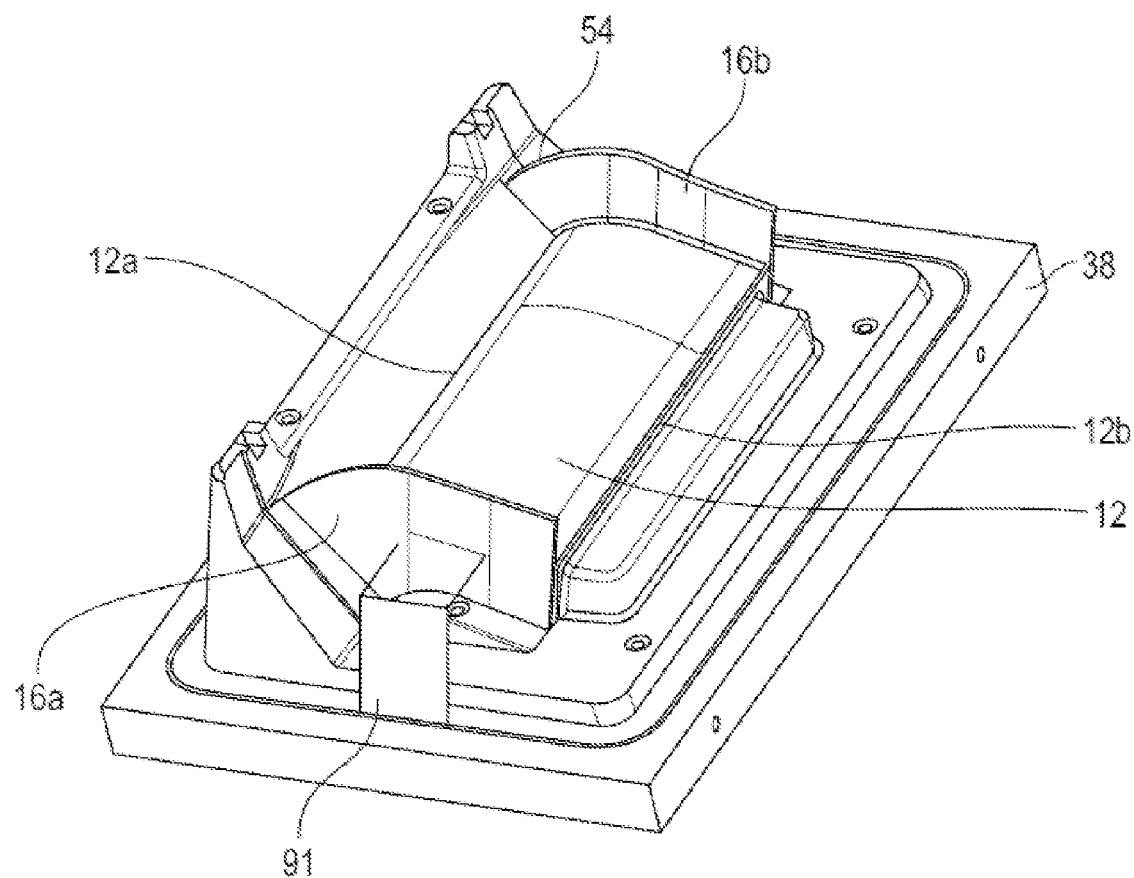

[Fig.10]
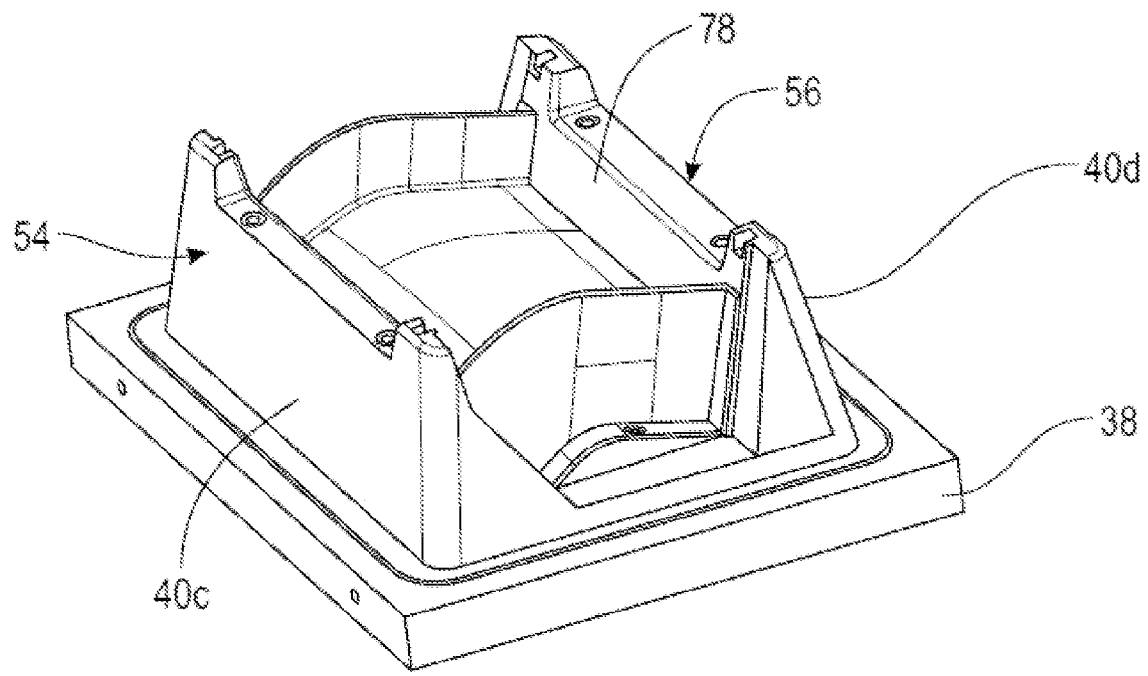

[Fig.11]
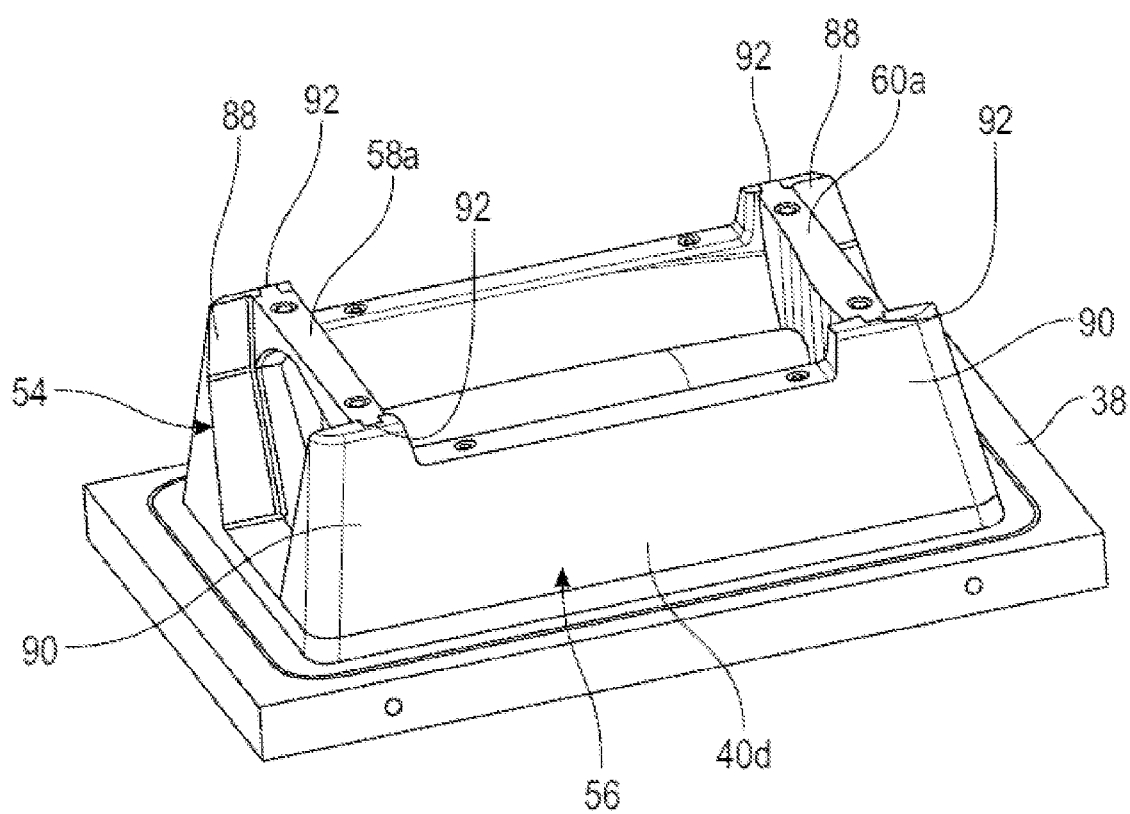

[Fig.12]
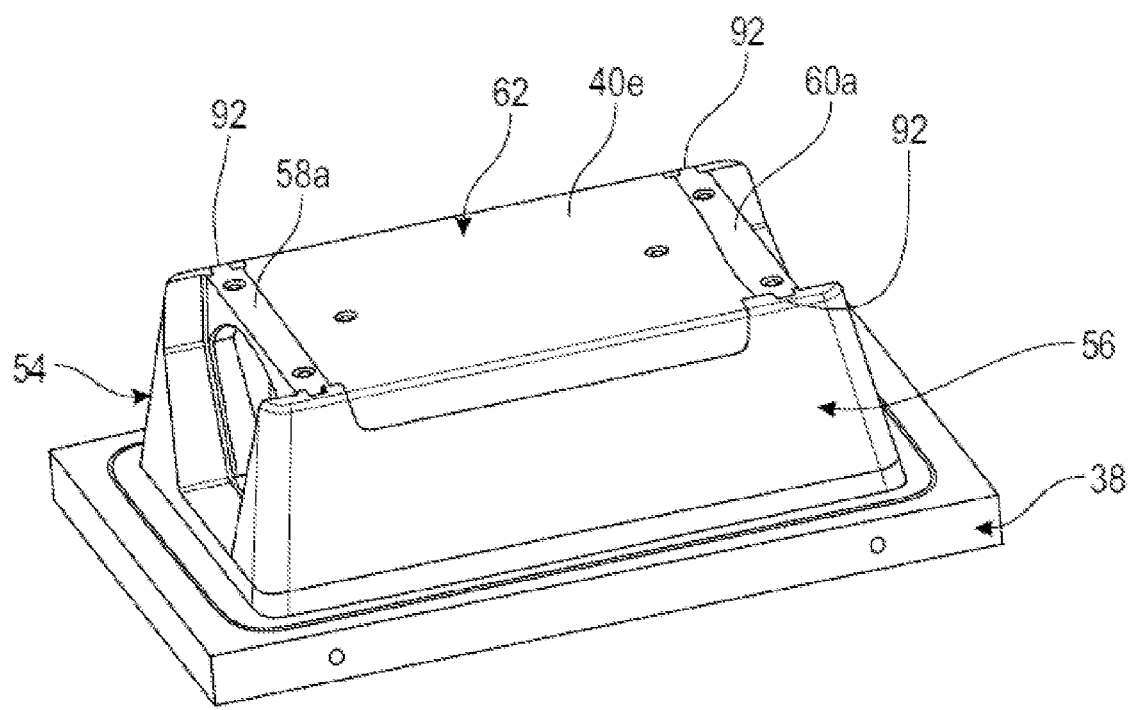

[Fig.13]
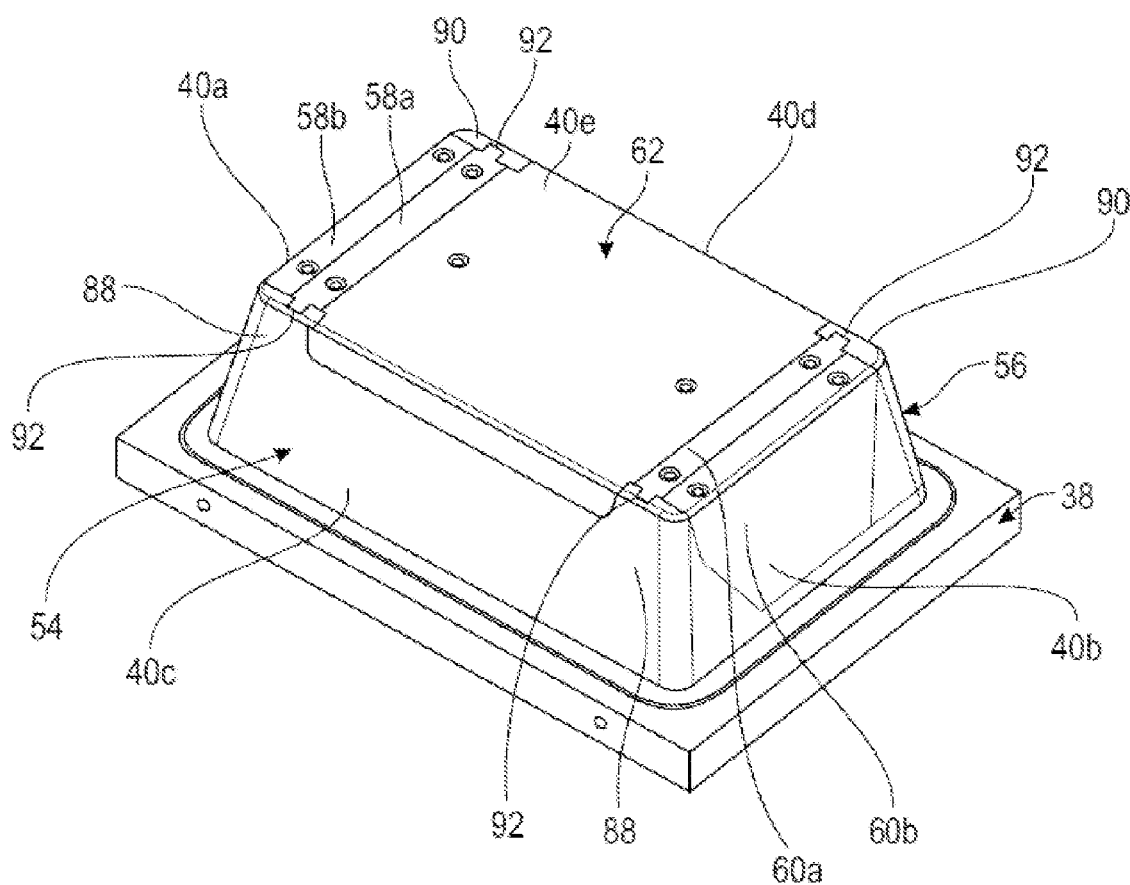

[Fig.14]
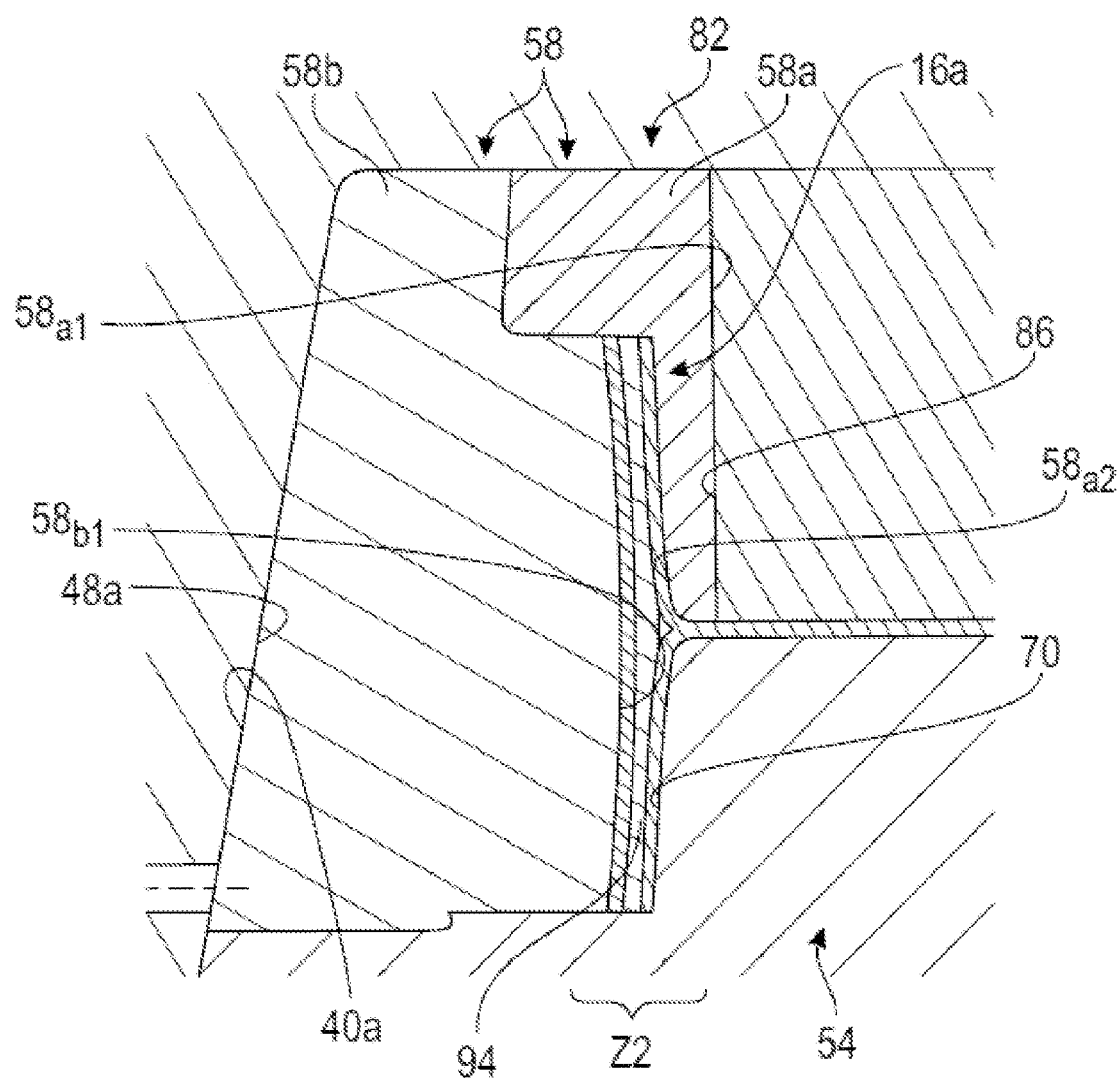

[Fig.15]
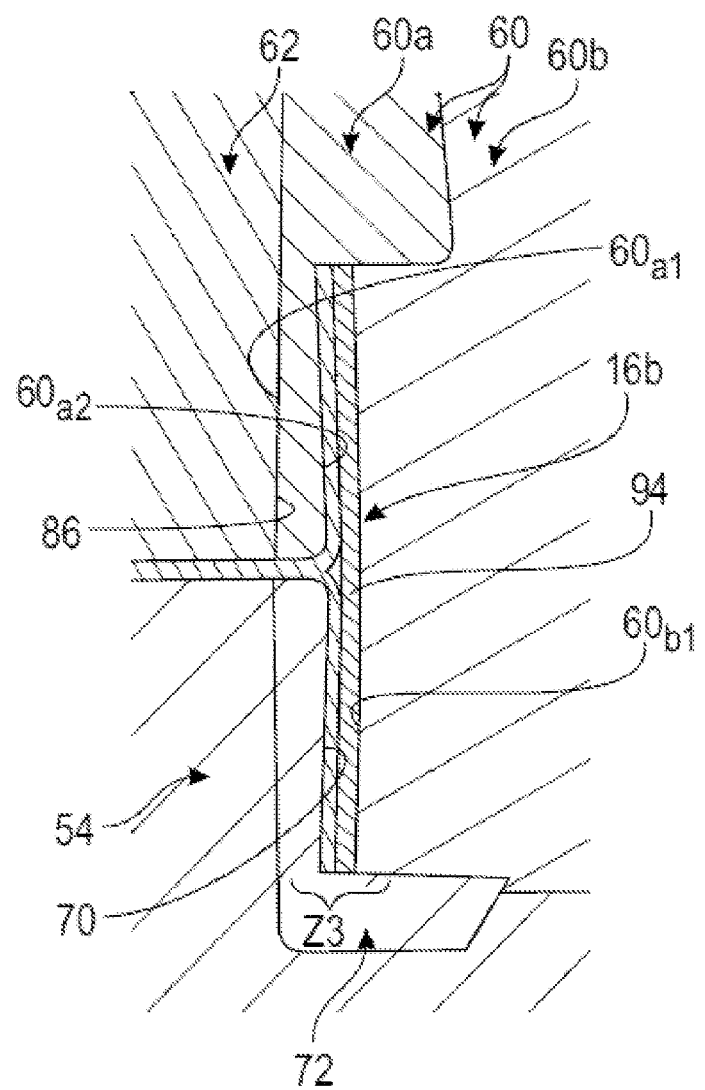

[Fig.16]
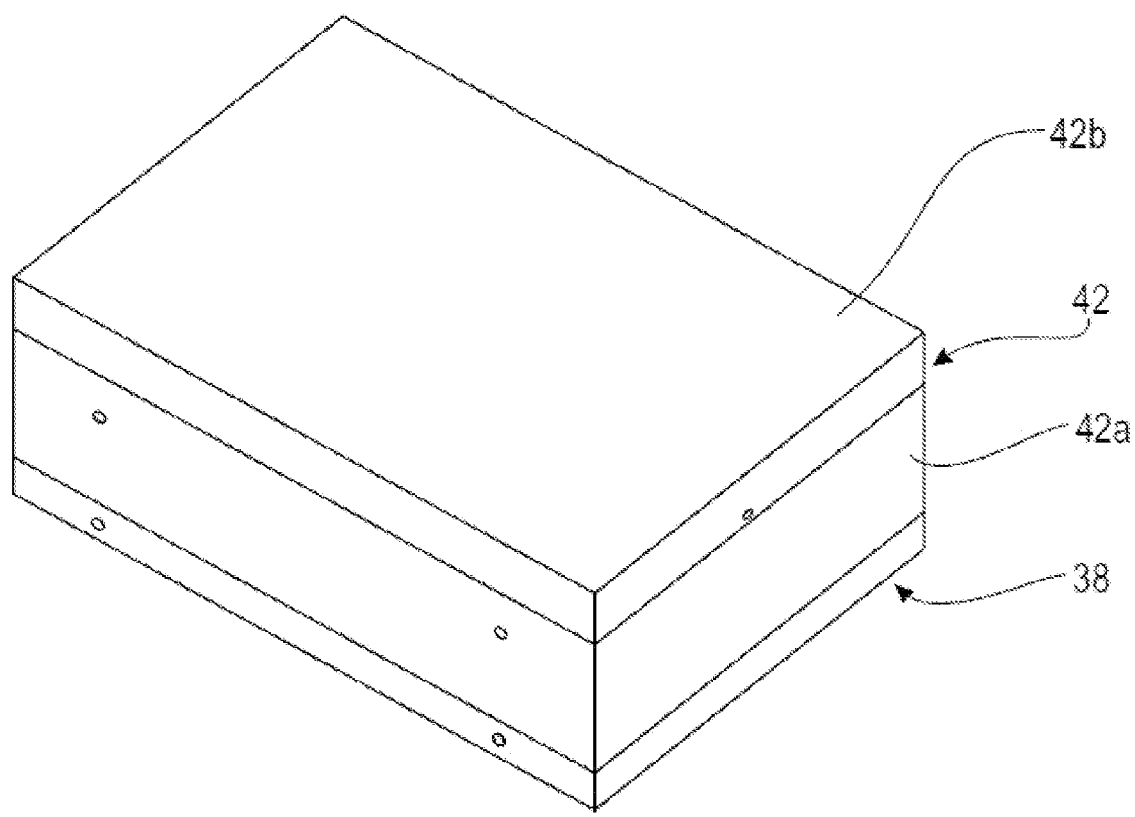

[Fig.17]
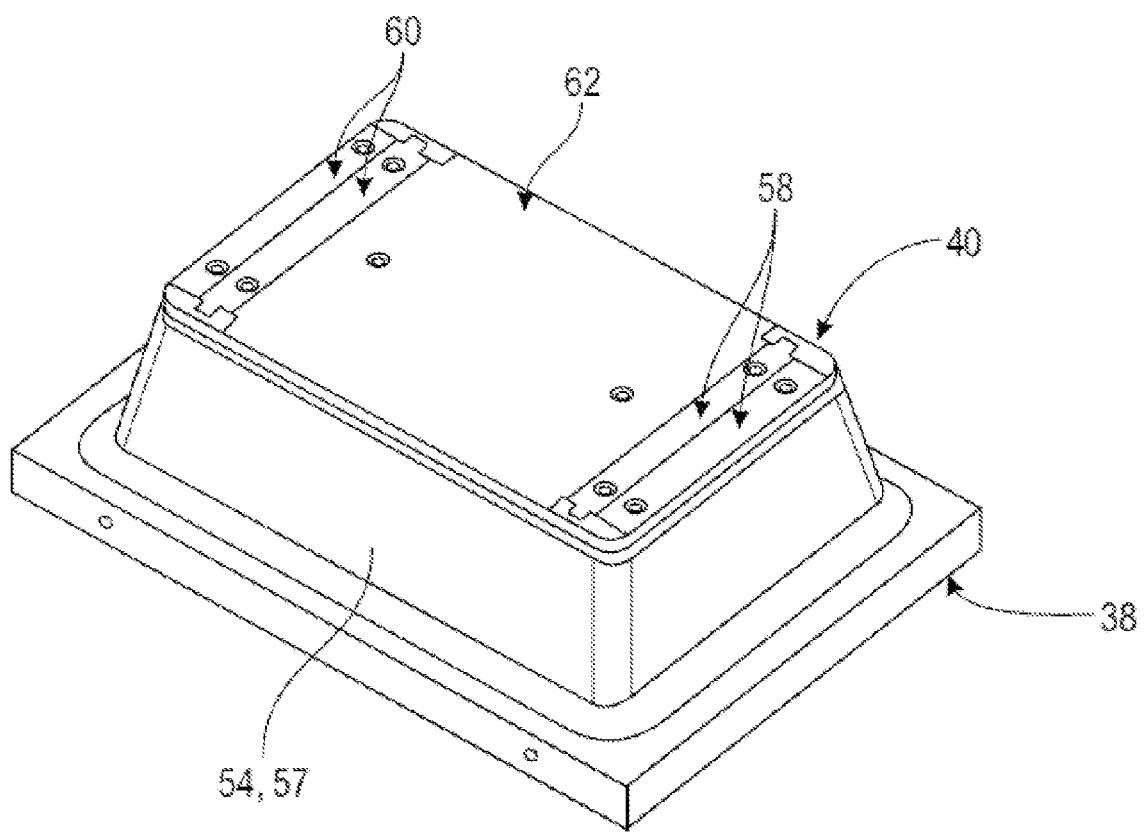

DEVICE FOR MOULDING A BLADED PART OF A TURBOMACHINE

TECHNICAL FIELD OF THE INVENTION

The present invention relates to a device for moulding a bladed part of a turbomachine, as well as to a method using this device.

BACKGROUND

The prior art comprises in particular the documents FR-A1-2 956 057, FR-A1-3 014 008, FR-A1-3 029 134, FR-A1-3 032 147, FR-A1-3 046 564, FR-A1-3 051 386 and WO-A1-2014/076 408.

The use of composite materials is advantageous in the aeronautical industry in particular because these materials have interesting mechanical performances for relatively low masses.

One process for manufacturing a composite part for the aeronautical industry, which is well known to the person skilled in the art, is the RTM process, the initials of which refer to the acronym of Resin Transfer Molding.

This is a process for producing a part from a composite material based on resin-impregnated fibres. Such a process is used, for example, to manufacture a turbomachine bladed part such as a fan blade or a rectifier blade.

An RTM process comprises several successive steps.

Firstly, fibres are woven together to obtain a three-dimensional preform blank, then the blank is cut to obtain a preform that has substantially the shape of the bladed part to be obtained. This preform is then placed in a mould, which is closed.

In the current technique, this mould has two successive functions or uses. Firstly, the mould is used to shape the preform by hot pressing. It is thus put under a press and in an oven in order to compress the preform and make it rigid.

The mould is then used to inject the resin into the preform for impregnation. The resin is injected through a supplying port of the mould, which is then placed in an oven to polymerise the resin and harden it.

The bladed part is then removed from the mould and can undergo various successive operations, including finishing.

It is advantageous to use a single mould to carry out the two stages of shaping and injecting the resin. However, the disadvantage of this technology is that the mould cannot be specifically adapted and optimised for one of these steps since it must also be suitable for carrying out the other step.

Furthermore, this mould is not suitable for carrying out other functions such as the co-injection of a metal shield on a leading edge of the bladed part.

The composite material of the bladed part is relatively fragile, and in particular sensitive to impact, and it is known to protected it by means of a metal shield which is fitted and secured to the leading edge of the bladed part.

The shield can be secured to the blade in several ways. A first way is to bond the shield to the bladed part after polymerization of the resin.

A second way of securing a shield to a bladed part consists of attaching the shield by co-moulding with the fibrous preform. The preform is placed in the mould and the shield is positioned on the edge of the preform intended to form the leading edge of the blade. The injected resin impregnates the preform and comes into contact with the shield to ensure its securing to the blade after polymerisation and hardening.

The above-mentioned mould in the current technique is not suitable for the co-injection and the co-moulding of the shield.

In addition, this mould comprises a large number of parts that are movable relative to each other to perform the compression moulding. This assembly of the parts creates resin leakage during the injection, which results in a resin waste and requires a complete cleaning of the mould after use.

The present invention proposes a solution to these problems which consists in proposing a moulding device specifically adapted to the implementation of only one of the above-mentioned functions, namely here the resin injection into the preform, and which is suitable to concomitantly carry out the securing of a metal shield to this preform.

SUMMARY OF THE INVENTION

The invention relates to a device for moulding at least one bladed part of a turbomachine, this device comprising at least one internal cavity configured to receive a fibrous preform, one edge of which is covered with a metal shield, and this device being configured to allow a resin to be injected into the cavity in order to impregnate said preform and to ensure that the shield is fixed to said edge, characterized in that it comprises:
  a base,
  a mould formed from several parts that are interlocked with each other, this mould defining said cavity and being configured to enclose said preform integrally, this mould being applied to the base and first sealing means being mounted between the mould and the base,
  a bell-shaped dome mounted on the mould and around the mould, this bell-shaped dome being applied to the base and second sealing means being mounted between the bell-shaped dome and the base, this bell-shaped dome being configured to be held clamped against the base and comprising inner surfaces cooperating by corner effect with complementary outer surfaces of the mould in order to apply a clamping force on the parts of said mould.

The moulding device is specifically designed and optimised to carry out the resin injection into the preform but also the co-injection of the edge of the preform which is covered by the metal shield, i.e. the securing of this shield on the preform.

The different parts of the mould allow to facilitate the assembly of the mould around the preform and the disassembly of the mould after injection and hardening of the resin. The bell-shaped dome covers the mould and is configured to hold the mould parts tightly together in order to limit, or even prevent, resin leakage between these parts. The base is sealingly connected to the mould and the bell-shaped dome, which prevents resin leakage between these parts, limits the resin waste, and allows the pressure to be maintained at the time of the injection, which is important for obtaining a good quality of the finished part (porosity).

The invention thus allows to optimise the method for moulding a bladed part by injecting resin into a preform equipped with a metal shield, in particular by reducing the resin waste and therefore the cost of manufacturing of the bladed part.

The fact of co-injecting the shield and the preform also allows to avoid an additional costly bonding step (autoclave cycle, more difficult pairing with a composite part than with a preform). This also allows a better final quality of the bonding because the part is injected "conformed" on the metal shield. It is also possible to carry out the co-moulding with polymerisation of an adhesive previously applied on the inner face of the shield to polymerise with the impregnating resin of the preform.

The use of the device for injecting the preform without its prior shaping also allows to considerably reduce the number of parts to make up the mould, thus facilitating the sealing and allowing resin savings.

The moulding device according to the invention may comprise one or more of the following characteristics, taken in isolation from each other, or in combination with each other:
- the base is generally parallelepipedal in shape and comprises a planar lower surface and an upper surface comprising a central recess for mounting and engaging a lower end of said mould; the base is for example configured to be extended horizontally in use;
- the base comprises around said recess a first peripheral groove for housing said first sealing means and a second peripheral groove for housing said second sealing means;
- the mould has a general truncated pyramid shape and comprises four inclined outer side surfaces connected to the four corners of a planar outer upper surface;
- the bell-shaped dome comprises an internal space for housing the mould, this space comprising four inner side surfaces which are inclined in a complementary manner to the outer surfaces of the mould, and which are also connected to the four corners of a planar inner bottom surface of the bell-shaped dome, the side surfaces and the bottom surface of the space of the bell-shaped dome being intended to be supported on the side surfaces and the upper surface of the mould respectively; the sliding of the surfaces of the bell-shaped dome on the surfaces of the mould ensures the clamping of the parts of the mould by corner effect;
- the mould comprises a lower shell which forms a lower end of the mould and a first side of the mould, this lower shell defining a lower portion of said cavity, and this first side being intended to be located at a leading edge of the bladed part and defining with the lower shell a groove configured to receive said shield; the mould is thus optimised to receive the metal shield and to ensure its fixing to the preform via the resin, or even with an additional adhesive;
- the mould comprises a side shell which forms a second side of the mould, this second side being opposite the first side and intended to be located at a trailing edge of the bladed part;
- the mould comprises an upper shell which forms an upper end of the mould and which defines an upper portion of said cavity;
- the upper shell comprises a first inclined surface intended to cooperate with a first surface complementary to the lower shell, and a second inclined surface intended to cooperate with a second surface complementary to the side shell, said first and second surfaces of the upper shell being located on two opposite sides of the shell and being inclined in a manner opposite to the inclination of at least some of said inner surfaces of the bell-shaped dome; the inner surfaces of the bell-shaped dome may be inclined in four different directions; the surfaces of the upper shell may themselves be inclined in two directions opposite each other and opposite one of the inner surfaces of the bell-shaped dome; the sliding of the surfaces of the upper shell on the surfaces of the lower shell and the side shell ensures the clamping of the mould parts by corner effect;
- said first surface extends to the level of said groove.
- said cavity comprises a blade area and two platform areas, the blade area extending between the two platform areas;
- the mould further comprises a first end shell intended to be located at one of the platform areas of the cavity, and to define at least a portion of this area;
- the mould comprises a second end shell intended to be located at the other of the platform areas of the cavity, and define at least a portion of this area;
- the first and second end shells each comprise at least two parts between which is defined at least a portion of the corresponding platform area;
- the parts of each of the first and second end shells are mounted on the lower shell or even on the side shell and interposed between uprights of the lower shell and the side shell;
- the lower shell defines a lower portion of one of the platform areas of the cavity, and a spacer is fitted on the lower shell to define a lower portion of the other of the platform areas of the cavity; this allows or facilitates the demoulding;
- the base and/or the bell-shaped dome comprises at least one resin injection port;
- the bell-shaped dome is made in one part, or in two parts namely a belt and a cover;

The present invention also relates to a method of moulding at least one turbomachine bladed part by means of a moulding device as described above, characterised in that it comprises the steps of:
a) mounting a preform in the cavity of the mould as well as a metal shield disposed on an edge of this preform,
b) closing the moulding device by enclosing the mould between the base and the bell-shaped dome,
c) pressing the moulding device so as to clamp the mould between the bell-shaped dome and the base, and possibly also to heat the device, and
d) injecting resin into the moulding device to impregnate the preform and secure the shield to this preform.

The bladed part can then be demoulded.

BRIEF DESCRIPTION OF FIGURES

Further characteristics and advantages will be apparent from the following description of a non-limiting embodiment of the invention with reference to the attached drawings in which:

FIG. 1 is a schematic perspective view of a turbomachine bladed part;

FIG. 2 is a schematic perspective view of a moulding device according to an embodiment of the invention;

FIG. 3 is a schematic cross-sectional view along the line III-Ill of FIG. 2, and shows a preform located in the moulding device;

FIG. 4 is a schematic cross-sectional view along the line IV-IV of FIG. 2, and shows the preform located in the moulding device;

FIG. 5 is a schematic perspective view of a base of the moulding device of FIG. 2;

FIG. 6 is a schematic perspective view of a lower shell of the moulding device of FIG. 2;

FIG. 7 is a schematic perspective view of the lower shell and the base of the moulding device of FIG. 2;

FIG. 8 is a schematic perspective view of the lower shell and the base of the moulding device of FIG. 2, as well as of the bladed part disposed on the lower shell;

FIG. 9 is a similar view to FIG. 8 and additionally shows schematically positioning members;

FIG. 10 is a schematic perspective view of the lower shell, the base and the side shell of the moulding device of FIG. 2, as well as of the bladed part disposed between the lower and side shells;

FIG. 11 is a schematic perspective view of the lower shell, the base, the side shell, and first end shell parts of the moulding device of FIG. 2, as well as the bladed part disposed between these shells;

FIG. 12 is a schematic perspective view of the lower shell, the base, the side shell, the first end shell parts, and an upper shell of the moulding device of FIG. 2, as well as the bladed part disposed between these shells;

FIG. 13 is a schematic perspective view of the complete mould and the base of the moulding device of FIG. 2;

FIG. 14 is a larger scale view of a detail of FIG. 4;

FIG. 15 is a larger scale view of another detail of FIG. 4;

FIG. 16 is a view similar to FIG. 2 and represents an alternative embodiment of the moulding device and in particular of its bell-shaped dome; and FIG. 17 is a view similar to that of FIG. 13 and represents a further alternative embodiment of the moulding device.

DETAILED DESCRIPTION OF THE INVENTION

Reference is first made to FIG. 1 which illustrates a composite material bladed part 10 for a turbomachine, this bladed part 10 being for example a fan vane or a rectifier blading for example of a secondary flow in the case of a turbofan engine.

The bladed part 10 comprises a blade 12. In the illustrated case where the part 10 is a fan blade, this blade 12 is connected by a stilt 14 to a root 16 which has, for example, a dovetail shape and is shaped so as to be engaged in a recess with a shape complementary to a rotor disc, in order to retain the vane on this disc.

In the alternative case where the part 10 is a rectifier blade, the blade 12 extends between two platforms 16*a*, 16*b* which extend substantially parallel to each other and perpendicular to an axis of elongation of the blade 12.

The blade 12 comprises a leading edge 12*a* and a trailing edge 12*b* of the gases flowing into the turbomachine. The blade 12 has a curved or twisted aerodynamic profile and comprises a pressure side 18 and a suction side 20 extending between the leading edge 12*a* and trailing edge 12*b*.

The blade 12 is made from a fibrous preform obtained by three-dimensional weaving of fibres, for example carbon.

The leading edge 12*a* of the blade is reinforced and protected by a metal shield 22 which is secured to this leading edge 12*a*. The shield 22 is for example made of a nickel and cobalt based alloy.

In the present invention, this securing is achieved by co-moulding the preform with the shield 22 by means of a moulding device 30, a first embodiment of which is shown in FIGS. 2 to 15.

The moulding device 30 is shown in its entirety in FIG. 2. In the example shown, it has a generally parallelepipedal shape.

FIGS. 3 and 4 represent cross-sectional views of the device 30 and show that it comprises at least one internal cavity 32 configured to receive the fibrous preform and the shield 22 of the bladed part 10 to be made.

In the example shown, this bladed part 10 is a rectifier blading. It can thus be seen that the cavity 32 essentially comprises three portions or areas, a blade area Z1 intended to receive the part of the preform forming the blade 12 of the bladed part 10, and two platform areas Z2, Z3 intended to receive the parts of the preform forming the platforms 16*a*, 16*b* of the bladed part 10.

The cavity 32 is further configured to receive the metal shield 22 which is previously disposed on the edge of the preform intended to form the leading edge 12*a* of the blade 12.

The moulding device 30 is configured to allow the injection of a thermosetting resin into the cavity 32 in order to impregnate the preform and to ensure the securing of the shield 22 on this resin-impregnated preform. The securing can be achieved either directly by the resin acting as an adhesive or by an added adhesive film. FIG. 4 shows a resin injection port 34 which is located on one side of the device, and this device 30 preferably also comprises a port 36 which allows the evacuation of excess resin and also to draw the vacuum and to avoid the air trapping in the cavity (porosity). This port 36 is for example located at an upper end of the device.

The moulding device 30 comprises essentially three components, namely a base 38, a mould 40 and a bell-shaped dome 42.

The base 38 forms a support and has a generally parallelepipedal shape in the example shown. The base 38 is shown alone in FIG. 5.

The base 38 comprises a planar lower surface 38*a* which may be applied directly to a planar and horizontal support surface or may be supported on a plate of a press.

The base 38 further comprises an upper surface 38*b* comprising a central recess 44 for mounting and engaging a lower end 40*aa* of the mould 40. This recess 44 has a generally rectangular or parallelepipedal shape.

The base 38 comprises around the recess 44 a first peripheral groove 46*a* for housing first sealing means, and a second peripheral groove 46*b* for housing second sealing means. These sealing means are, for example, elastomer seals which each form a closed loop. It can be seen that the groove 46*a* extends around and adjacent to the recess 44 and that the groove 46*b* extends between the groove and the outer peripheral edge of the base 38.

The bell-shaped dome 42 is particularly visible in FIGS. 2 to 4. As its name suggests, this element is bell-shaped dome-shaped and can be considered as comprising a peripheral belt 42*a* and a cover 42*b* covering this belt.

In the embodiment of FIGS. 2 to 15, the bell-shaped dome 42 is formed in one part, whereas in the alternative embodiment of FIG. 16, the bell-shaped dome 42 is formed in two parts by assembling a belt 42*a* and a cover 42*b*.

The bell-shaped dome 42 is configured to be mounted on the mould 40 and around the mould 40. It is further configured to bear in a sealed manner on the base 38 and to bear on the mould 40 by exerting a pressure force on the latter by a corner effect.

In the example shown, the bell-shaped dome 42 is externally shaped like a parallelepiped with dimensions in width and length comparable to those of the base 38, so that when the bell-shaped dome 42 is placed on the base 38, their side faces are substantially aligned in pairs (see FIG. 2). The bell-shaped dome 42 has a thickness greater than that of the base 38. The bell-shaped dome 42 has a planar upper surface 42*c* which can bear on a jaw or other plate of a press.

The sealing between the bell-shaped dome 42 and the base 38 is ensured by the sealing means located in the groove 46*b*. For this purpose, the lower end of the bell-shaped dome 42 bears on these sealing means which are thus clamped during the assembly between the bell-shaped dome 42 and the base 38.

The bell-shaped dome 42 comprises an internal space 48 for housing the mould 40. This space 48 opens onto a lower surface at the lower end of the bell-shaped dome 42.

The space 48 defines a truncated pyramid-shaped volume. The space 48 thus comprises four inner side surfaces 48*a*, 48*b*, 48*c*, 48*d* which are inclined and which are also connected to the four corners of a planar inner bottom surface 48*e* of the bell-shaped dome 48. The surface 48*e* is here rectangular. The side surfaces 48*a*, 48*b*, 48*c*, 48*d* each have a generally trapezoidal shape.

The side surfaces 48*a*, 48*b* are located on two opposite sides of the bell-shaped dome 42 and at the platform areas Z2, Z3 of the cavity 32 (see FIG. 4). The side surfaces 48*c*, 48*d* are located on two opposite sides of the bell-shaped dome 42 and at the leading edge 12*a* and trailing edge 12*b* of the blade 12 (see FIG. 3). FIG. 4 shows that the aforementioned injection port 34 opens onto the surface 48*a*, in the vicinity of the lower end of the bell-shaped dome 42.

The inner surfaces 48*a*, 48*b*, 48*c*, 48*d* and 48*e* of the bell-shaped dome 42 are intended to bear on complementary surfaces of the mould 40 in order to apply by corner effect a clamping and holding force to the mould 40 which is carried out by the assembly of several parts.

The mould 40 has a general shape of a truncated pyramid and comprises four outer side surfaces 40*a*, 40*b*, 40*c*, 40*d* inclined and connected to the four corners of a planar outer upper surface 40*e*. The surface 40*e* is rectangular here. The side surfaces 40*a*, 40*b*, 40*c*, 40*d* each have a generally trapezoidal shape.

The side surfaces 40*a*, 40*b* are located on two opposite sides of the mould 40 and at the platform areas Z2, Z3 of the cavity 32 (see FIG. 4). The side surfaces 40*c*, 40*d* are located on two opposite sides of the mould 40 and at the leading edge 12*a* and trailing edge 12*b* of the blade 12 (see FIG. 3).

As can be seen in FIGS. 3 and 4, the surfaces 48*a*, 48*b* of the bell-shaped dome 42 are substantially complementary to the surfaces 40*a*, 40*b* and intended to cooperate by sliding and abutting with these surfaces 40*a*, 40*b* when the bell-shaped dome 42 is mounted on the mould 40. The surfaces 48*c*, 48*d* of the bell-shaped dome 42 are substantially complementary to the surfaces 40*c*, 40*d* and intended to cooperate by sliding and abutting with these surfaces 40*c*, 40*d* when the bell-shaped dome 42 is mounted on the mould 40. The surface 48*e* of the bell-shaped dome 42 is intended to bear on the surface 40*e* when the bell-shaped dome 42 is mounted on the mould 40.

The lower end 40*aa* of the mould 40 is engaged in the recess 44 of the base 38 and comprises a complementary shape to be engaged by male-female interlocking and in this recess. The lower end 40*aa* of the mould 40 thus comprises a lower boss 50 (see FIGS. 3, 4 and 6) which has a complementary shape to the recess 44. The lower end 40*aa* of the mould 40 comprises a peripheral surface 52 which extends around the boss 50 and is intended to bear on the sealing means located in the groove 46*a* of the base 38.

The mould 40 is obtained by assembling several parts to facilitate its assembly around the preform and the shield 22 and to facilitate, in particular, the demoulding of the bladed part 10 after the resin injected into the mould 40 has hardened.

The parts of the mould 40 are here formed by shells or shell elements which are interlocked with each other to define the cavity 32. As can be seen in the drawings, the cavity 32 is entirely delimited by the mould 40, meaning that the mould 40 is configured to fully enclose the preform and the shield 22.

In the non-limiting example shown, the mould 40 comprises essentially five shells, namely:
a lower shell 54,
a side shell 56,
two end shells 58, 60, and
an upper shell 62.

The lower shell 54 is shown alone in FIG. 6 and mounted on the base 38 in FIG. 7. This shell 54 forms the lower end 40*aa* of the mould 40, which comprises the boss 50, as well as a first side 57 of the mould, namely that which comprises the surface 40*c* located on the side of the leading edge 12*a* of the blade 12 and thus of the shield 22.

The lower shell 54 defines a lower part of the cavity 32 as well as a groove 64 of this cavity which is shaped to receive the metal shield 22. This groove 64 is located at the junction of the lower end 40*aa* and the first side 57 of the mould 40. To this end, the lower end 40*aa* of the mould comprises an upper surface 66 having a convex curved shape in cross-section (see FIG. 3) intended to be located on the side of the pressure side 18 of the blade 12. The first side 57 of the mould comprises an inclined surface 68 extending from down upwards from an edge of the surface 66. The intersection of the surfaces 66, 68 forms the aforementioned groove 64.

It can be seen from FIG. 3 that the surface 68 is located on the side of the surface 40*c* of the mould and the surface 48*c* of the bell-shaped dome 42 and that this surface 68 is inclined in a manner opposite to the inclination of the surfaces 40*c*, 48*c*. In the example shown, the surfaces 40*c*, 48*c*, on the one hand, and the surface 68, on the other hand, converge towards the upper end of the moulding device 30.

It can be seen from FIGS. 4 and 7 that the surface 66 is connected at the platform areas Z2, Z3 of the cavity 32 to the end surfaces 70 which are substantially parallel to each other and perpendicular to the surface 66.

The lower shell 54 defines at least a lower portion of each of the platform areas Z2, Z3 of the cavity 32. One of the surfaces 70 may be formed directly on the shell 54 (on the left hand side in FIG. 4) and the other of the surfaces 70 (on the right hand side in FIG. 3) may be formed by a spacer 72 fitted to the lower shell 54 to facilitate the removal of the bladed part 10 from the mould, particularly when it has a complex shape or conformation.

The side shell 56 is visible in FIGS. 3, 10 and 11 in particular and forms a second side 74 of the mould 40, namely that which comprises the surface 40*d* located on the side of the trailing edge 12*b* of the blade 12.

The side shell 56 is mounted on and interlocked to the lower shell 54 and comprises at its lower end a complementary shape (with steps 76—see FIG. 3) of a part of the mould.

The side shell 56 comprises an inclined surface 78 which extends from down upwards from the steps 76. The intersection of the steps 76 and the surface 78 forms a sharp ridge 79 which is configured to be positioned along an edge of the surface 66 and at the trailing edge 12*b* of the blade 12. The surface 78 thus extends upwardly from the surface 66.

It can be seen from FIG. 3 that the surface 78 is located on the side of the surface 40*d* of the mould and the surface 48*d* of the bell-shaped dome 42 and that this surface 78 is inclined opposite to the inclination of the surfaces 40*d*, 48*d*. In the example shown, the surfaces 40*d*, 48*d* on the one hand and the surface 78 on the other hand converge towards the upper end of the moulding device 30. FIG. 3 further shows that the surfaces 68 and 78 have reversed inclinations.

The upper shell 62 forms the upper end of the mould 40, which comprises the surface 40*e*. The shell 62 defines an upper part of the cavity 32. For this purpose, the lower end of the shell 62 comprises a lower surface 80 having a concave curved shape in cross-section (see FIG. 3) intended to be located on the suction side 20 of the blade 12, and to extend from the trailing edge 12*b* of the blade 12 to the leading edge 12*a* and the metal shield. This surface 80 extends between two inclined side surfaces 82, 84 which are complementary to the surfaces 68, 78 and intended to cooperate by sliding and abutting with these surfaces during the assembly of the mould 40. In the assembled position, the upper shell 62 bears on upper ends of the lower shell 54 and the side shell 56 (FIG. 3).

The surfaces 82, 84 of the upper shell 62 are located at the sides of the mould 40 comprising the surfaces 40*c* and 40*d*. At the other two sides of the mould comprising the surfaces 40*a* and 40*b*, the upper shell comprises end surfaces 86 substantially parallel to each other and perpendicular to the upper surface 40*e* of the mould. As can be seen in FIG. 4, the surfaces 86 are aligned with the surfaces 70 when the mould 40 is assembled.

The end shells 58, 60 are intended to delimit the platform areas Z2, Z3 of the cavity 32 with a part of the lower shell 54 and of the spacer 72 (FIG. 4).

A first end shell 58 located on the left in FIG. 4 comprises the surface 40*a* and is formed by the assembly of two parts 58*a*, 58*b* delimiting between them a portion of the platform area Z2.

A first of the parts 58*a* is mounted between the upper shell 62 and a portion of the platform 16*a*. This first part 58*a* comprises a surface 58*a*1 complementary to the surface 86 and intended to cooperate by sliding with the latter during the assembly of the mould. This first part 58*a* also comprises a surface 58*a*2 delimiting a portion of the platform area Z1 (see FIG. 14).

The second part 58*b* is mounted between the part 58*a* and the bell-shaped dome 42 and comprises the aforementioned surface 40*a*. The second part 58*b* further comprises a surface 58*b*1 delimiting a side of the platform area Z1, opposite the blade 12. It can be seen from FIG. 14 that the platform area Z1 is delimited by the surface 58*b*1, on one side, and by the surfaces 70 and 58*a*2, on the other side.

The parts 58*a*, 58*b* are interlocked with each other by complementary shapes and are furthermore interposed between the first side 57 of the lower shell 54 and the side shell 56. More specifically, as can be seen in FIGS. 11 to 13, the parts 58*a*, 58*b* are engaged between uprights 88, 90 of the lower shell 54 and the side shell 56. The parts 58*a*, 58*b* may be mounted by sliding between these uprights by rail-slide systems 92.

The second end shell 60 located to the right hand side in FIG. 4 comprises the surface 40*b* and is formed by the assembly of two parts 60*a*, 60*b* delimiting between them a portion of the platform area Z3.

A first of the parts 60*a* is mounted between the upper shell 62 and a portion of the platform 16*b*. This first part 60*a* comprises a surface 60*a*1 complementary to the surface 86 and intended to cooperate by sliding with the latter during the assembly of the mould. This first part 60*a* also comprises a surface 60*a*2 delimiting a portion of the platform area Z3.

The second part 60*b* is mounted between the part 60*a* and the bell-shaped dome 42 and comprises the aforementioned surface 40*b*. The second part 60*b* further comprises a surface 60*b*1 delimiting a side of the platform area, opposite the blade 12. It can be seen from FIG. 15 that the platform area Z3 is delimited by the surface 60*b*1, on one side, and by the surface 60*a*2 and the surface 70 of the spacer 72, on the other side.

The parts 60*a*, 60*b* are interlocked with each other by complementary shapes and are further interposed between the first side 57 of the lower shell 54 and the side shell 56. More specifically, as can be seen in FIGS. 11 to 13, the parts 60*a*, 60*b* are engaged between uprights 88, 90 of the lower shell 54 and the side shell 56. The parts 60*a*, 60*b* may also be mounted by sliding between these uprights by rail-slide systems 92.

FIG. 16 shows an alternative embodiment of the bell-shaped dome 42 already referred to in the foregoing, which is to produce it in two parts, a belt 42*a* which comprises the inner surfaces 48*a*, 48*b*, 48*c* and 48*d* and a cover 42*b* which comprises the bottom surface 48*e*. The dividing line between the cover 42*a* and the belt 42*b* could advantageously be located so as to encapsulate the upper shell 62, so as to keep it secured to the lower shell 54 of the mould and so that it does not remain blocked in the bell-shaped dome 42 during the demoulding.

FIG. 17 illustrates another alternative embodiment, this time of the mould 40, in which the lower shell 54 may also comprise an additional side (in addition to the side 57). In other words, one of the end shells 58, 60 of the mould, or even just a part such as the part 60*b* or the part 58*b*, could be integrated into the lower shell 54.

In yet another alternative not shown, the cavity 32 could be shaped to accommodate several preforms for simultaneous production of several bladed parts, or several separate cavities for production of these bladed parts.

The present invention also relates to a method for moulding at least one bladed part of a turbomachine by means of the moulding device 30.

This method comprises in particular the steps of:
a) mounting the preform in the cavity 32 of the mould 40 as well as the metal shield 22 disposed on an edge of this preform,
b) closing the moulding device 30 by enclosing the mould 40 between the base 38 and the bell-shaped dome 40,
c) pressing the moulding device 30 so as to clamp the mould 40 between the bell-shaped dome 42 and the base 38, and
d) injecting resin into the moulding device 30 to impregnate the preform and secure the shield 22 to this preform.

The step a) is illustrated in FIGS. 8 to 13.

In FIG. 8, the preform is disposed on the lower shell 54 of the mould 40 so that its pressure side 18 bears on the surface 66 and its edge equipped with the metal shield 22 is located in the groove 64. Parts of the platforms 16*a*, 16*b* then bear on the surfaces 70.

In FIG. 9, positioning members 91 are disposed on the base 38 at the level of the platforms 16*a*, 16*b* so as to hold in place blocks or layers 94 or woven preform, which are added on the surfaces of the platforms opposite the blade 12. These blocks or layers 94 are particularly visible in FIGS. 14 and 15. These blocks or layers may be made of three-dimensionally interwoven fibre laps like the rest of the preform. In FIG. 14, the block or the layer 94 is disposed between, sacrificial (machined) or non-sacrificial glass folds, located on the left hand side of the drawing, for the resistance to galvanic corrosion or friction for example, and 3D woven carbon which composes the blade of the preform, with continuity of the fibres in the radius, located on the right hand side of the drawing.

In FIG. 10, the side shell 56 is mounted on the lower shell 54 and allows to wedge the trailing edge 12b of the preform.

The parts 58a, 60a of the end shells 58, 60 are mounted between the uprights 88, 90 in FIG. 11, then the upper shell 62 is mounted between these parts 58a, 58b and on the preform in FIG. 12. Its lower surface 80 then bears on the suction side 20 of the blade 12.

The parts 58b, 60b of the end shells 58, 60 are then mounted between the uprights 88, 90 in FIG. 13.

The step b) is illustrated in FIG. 2 and consists of capping the mould 40 with the bell-shaped dome 42 which bears on the mould 40 and the base 38. The closure of the device by the bell-shaped dome 42 allows the parts of the mould to be positioned in relation to each other, to be pressed against each other, and to ensure that the preform is compacted to a predetermined thickness.

The device 30 is pressed in the step d) to clamp the shells 54, 56, 58, 60, 62 of the mould 40 against each other, and the resin is injected into the cavity 32 in the step d). The resin injection may be carried out by pre-heating the device 30 to a predetermined temperature in order to fluidise the resin. Once the resin is fully injected, it is heated again to a curing temperature and to activate the polymerisation of the resin and its hardening.

The device according to the invention is advantageous in that it is adapted and optimised for the resin injection into the preform and the simultaneous co-moulding of the shield. Furthermore, the dissociation of the mould from the base and the bell-shaped dome allows the use of several mould configurations for the same bell-shaped dome and the same base, the different mould configurations differing from one another in the shape and the dimensions of the internal cavities 32 for example. A device according to the invention can thus be used for the manufacture of several different bladed parts using the appropriate moulds for these parts.

The invention claimed is:

1. A device for moulding at least one bladed part of a turbomachine, the device comprising at least one internal cavity configured to receive a fibrous preform, one edge of which is covered with a metal shield, and the device being configured to allow a resin to be injected into the at least one internal cavity in order to impregnate said preform and to ensure that the shield is fixed to said edge, wherein the device comprises:
  a base,
  a mould formed from parts that are interlocked with each other, the mould defining said at least one internal cavity and being configured to enclose said preform integrally, said parts comprising at least a lower shell in contact with the base and having portions protruding in a direction parallel to the base, the lower shell being configured at least to close one end of a portion of the at least one internal cavity defined in a plane perpendicular to the base, the mould being applied to the base and first sealing device being mounted between the mould and the base,
  a bell-shaped dome mounted on the mould and around the mould, the bell-shaped dome being applied to the base and second sealing device being mounted between the bell-shaped dome and the base, the bell-shaped dome being configured to be held clamped against the base and comprising inner surfaces cooperating with complementary outer surfaces of the mould in order to apply a clamping force on the parts of the mould by corner effect wherein the inner surfaces of the bell-shaped dome slide and abut with the outer surfaces of the mould to hold the bell-shaped dome and the mould together, the mould, the base and the bell-shaped dome being distinct from each other;
  an evacuation port configured for an evacuation of an excess of resin and also to draw a vacuum from the at least one internal cavity, the evacuation port being located on an upper end of a lateral wall of the bell-shaped dome, said lateral wall being perpendicular to a planar lower surface of the base when said bell-shaped dome is applied to the base, and
  wherein the mould comprises a lower end mounted and engaged in a central recess of an upper surface of the base, the lower end of the mould comprising a complementary shape configured to engage by male-female interlocking in the central recess.

2. The moulding device according to claim 1, wherein the base is generally parallelepipedal in shape and comprises a planar lower surface.

3. The moulding device according to claim 1, wherein the base comprises around the central recess a first peripheral groove for housing the first sealing device and a second peripheral groove for housing the second sealing device.

4. The moulding device according to claim 1, wherein:
  the mould has a general truncated pyramid shape and comprises four inclined outer side surfaces connected to the four corners of a planar outer upper surface, and
  the bell-shaped dome comprises an internal space for housing the mould, the space comprising four inner side surfaces which are inclined in a complementary manner to the outer surfaces of the mould, and which are also connected to the four corners of a planar inner bottom surface of the bell-shaped dome, the side surfaces and the bottom surface of the space of the bell-shaped dome being intended to be supported on the side surfaces and the upper surface of the mould respectively.

5. The moulding device according to claim 1, wherein the lower shell which forms a lower end of the mould and a first side of the mould, the lower shell defining a lower portion of the at least one internal cavity, and the first side being intended to be located at a leading edge of the bladed part and defining with the lower shell a groove configured to receive the shield.

6. The moulding device according to claim 5, wherein the mould further comprises at least:
  a side shell which forms a second side of the mould, the second side being opposite the first side and intended to be located at a trailing edge of the bladed part, and
  an upper shell which forms an upper end of the mould and which defines an upper portion of the cavity.

7. The moulding device according to claim 6, wherein the upper shell comprises a first inclined surface intended to cooperate with a first surface complementary to the lower shell, and a second inclined surface intended to cooperate with a second surface complementary to the side shell, said first and second surfaces of the upper shell being located on two opposite sides of the shell and being inclined in a manner opposite to the inclination of at least some of the inner surfaces of the bell-shaped dome.

8. The moulding device according to claim 7, wherein the first surface extends to the level of the groove.

9. The moulding device according to claim 8, wherein, the at least one internal cavity comprising a blade area and two platform areas, the blade area extending between the two platform areas, the mould further comprises:
  a first end shell for being located at one of the two platform areas of the cavity and define at least a portion of the one of the two platform areas, and a second end shell intended to be located at the other of the two platform areas of the cavity, and define at least a portion of the other of the two platform areas.

10. The moulding device according to claim 9, wherein the first and second end shells each comprise at least two parts between which is defined at least a portion of the corresponding platform area.

11. The moulding device according to claim 10, wherein the parts of each of the first and second end shells are mounted on the lower shell or even on the side shell and interposed between uprights of the lower shell and the side shell.

12. The moulding device according to claim 9, wherein the lower shell defines a lower portion of the one of the two platform areas of the at least one internal cavity, and a spacer is fitted on the lower shell to define a lower portion of the other of the two platform areas of the cavity.

13. The moulding device according to claim 12, wherein the spacer comprises a portion which is parallel to one of the protruding portions of the lower shell and which is bearing against said protruding portion.

14. The moulding device according to claim 13, wherein one of the first or second end shells comprises a portion resting on the portion of the spacer which is parallel to the protruding portion of the lower shell.

15. The moulding device according to claim 1, wherein the base and/or the bell-shaped dome comprises at least one resin injection port.

16. The moulding device according to claim 1, wherein the bell-shaped dome is made in one part, or in two parts including a belt and a cover.

17. A device for moulding at least one bladed part of a turbomachine, the device comprising at least one internal cavity configured to receive a fibrous preform, one edge of which is covered with a metal shield, and the device being configured to allow a resin to be injected into the cavity in order to impregnate said preform and to ensure that the shield is fixed to said edge, wherein the device comprises:
  a base;
  a mould formed from a set of parts that are interlocked with each other, the mould defining said at least one internal cavity and being configured to enclose said preform integrally, said parts including at least:
    a lower shell made in one part and comprising at least:
      a first and a second protruding portions parallel to a lower surface of the base;
      a third protruding portion perpendicular to the first and second protruding portions; and
    a spacer fitted to the lower shell, the spacer being made in one part and comprising:
      a first portion which is parallel to the third protruding portion of the lower shell and which is bearing against said third protruding portion; and
      a second portion which is parallel to one of the first and second protruding portions of the lower shell and which is bearing against said first or second protruding portion, said second portion of the spacer closing an end surface of the at least one internal cavity perpendicular to the base and to the first or second protruding portion of said lower shell against which the second portion is bearing,
  the mould being applied to the base and first sealing device being mounted between the mould and the base, and
  a bell-shaped dome mounted on the mould and around the mould, the bell-shaped dome being applied to the base and second sealing device being mounted between the bell-shaped dome and the base, the bell-shaped dome being configured to be held clamped against the base and comprising inner surfaces cooperating with complementary outer surfaces of the mould in order to apply a clamping force on the parts of the mould by corner effect wherein the inner surfaces of the bell-shaped dome slide and abut with the outer surfaces of the mould to hold the bell-shaped dome and the mould together.

* * * * *